(12) United States Patent
Morin et al.

(10) Patent No.: US 11,463,749 B2
(45) Date of Patent: Oct. 4, 2022

(54) METHODS FOR PROCESSING AUDIOVISUAL STREAMS AND CORRESPONDING DEVICES, ELECTRONIC ASSEMBLY, SYSTEM, COMPUTER READABLE PROGRAM PRODUCTS AND STORAGE MEDIA

(71) Applicant: InterDigital CE Patent Holdings, Paris (FR)

(72) Inventors: Thomas Morin, Cesson-Sevigne (FR); Goulven Querre, Noyal sur Vilaine (FR); Anthony Pesin, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/977,132

(22) PCT Filed: Feb. 28, 2019

(86) PCT No.: PCT/EP2019/055018
§ 371 (c)(1),
(2) Date: Sep. 1, 2020

(87) PCT Pub. No.: WO2019/166567
PCT Pub. Date: Sep. 6, 2019

(65) Prior Publication Data
US 2021/0006844 A1    Jan. 7, 2021

(30) Foreign Application Priority Data
Mar. 2, 2018    (EP) .................................... 18305227

(51) Int. Cl.
*H04N 21/2381*    (2011.01)
*H04N 21/236*    (2011.01)
(Continued)

(52) U.S. Cl.
CPC ... *H04N 21/2381* (2013.01); *H04N 21/23614* (2013.01); *H04N 21/4263* (2013.01);
(Continued)

(58) Field of Classification Search
CPC ......... H04N 21/2381; H04N 21/23614; H04N 21/4263; H04N 21/4394; H04N 21/44008;
(Continued)

(56) References Cited

U.S. PATENT DOCUMENTS 6,647,015 B2    11/2003  Malkemes et al.
8,532,293 B2    9/2013   Kahn
(Continued)

FOREIGN PATENT DOCUMENTS

CN    1149795 A    5/1997
CN    1419757 A    5/2003
(Continued)

OTHER PUBLICATIONS

Anonymous, "Devolo Magic: Live the day after tomorrow today!"; Devolo, https://www.devolo.at/article/dlan-tv-sat-multituner-kit-powerline/, Jul. 20, 2020, 8 pages.
(Continued)

*Primary Examiner* — Nasser M Goodarzi
*Assistant Examiner* — Adil Ocak
(74) *Attorney, Agent, or Firm* — Volpe Koenig

(57) ABSTRACT

The disclosure relates to a method comprising: receiving, from a first network, a input signal conveying a plurality of audio and/or video channels; sending, on a second network, a first signal comprising a first digital stream conveying a first audio and/or video channel comprised in the input signal, the first signal comprising, for a second channel of said plurality of audio and/or video channels other than the first channel, and a second digital stream comprising an
(Continued)

identifying information of the other second channel and requiring less bandwidth than a digital stream conveying the other second audio and/or video channel of the input signal. It also relates to a method comprising: receiving via a first network a digital signal comprising a plurality of streams, one stream conveying a channel, converting the digital signal to a signal; outputting the signal to a tuning device; upon obtaining a channel identifier representative of a tuning, sending, via the first network, a channel change request comprising the channel identifier to a transmitter of the digital signal. It also relates to corresponding signal, devices, system, computer readable program products and storage media.

7 Claims, 5 Drawing Sheets

(51) Int. Cl.
  *H04N 21/426* (2011.01)
  *H04N 21/439* (2011.01)
  *H04N 21/44* (2011.01)
  *H04N 21/442* (2011.01)

(52) U.S. Cl.
  CPC ... *H04N 21/4394* (2013.01); *H04N 21/44008* (2013.01); *H04N 21/44204* (2013.01)

(58) Field of Classification Search
  CPC ......... H04N 21/44204; H04N 21/2143; H04N 21/2343
  See application file for complete search history.

(56) References Cited

U.S. PATENT DOCUMENTS

| | | | |
|---|---|---|---|
| 2004/0190629 A1* | 9/2004 | Cooper | H04N 21/23614 375/240.26 |
| 2004/0250273 A1 | 12/2004 | Swix et al. | |
| 2006/0117371 A1 | 6/2006 | Margulis | |
| 2006/0195886 A1* | 8/2006 | Ashley | H04N 21/235 725/138 |
| 2006/0271954 A1 | 11/2006 | Lankford et al. | |
| 2008/0032685 A1 | 2/2008 | Talty et al. | |
| 2008/0120667 A1 | 5/2008 | Zaltsman | |
| 2010/0125888 A1 | 5/2010 | Jerram | |
| 2010/0265391 A1 | 10/2010 | Muramatsu et al. | |
| 2011/0252451 A1 | 10/2011 | Turgeman et al. | |
| 2013/0167168 A1* | 6/2013 | Ellis | H04N 21/25891 725/12 |
| 2013/0219436 A1 | 8/2013 | Mantinger | |
| 2013/0294527 A1* | 11/2013 | Cholas | H04N 21/440218 375/240.26 |
| 2016/0360270 A1* | 12/2016 | Pati | H04N 21/4826 |

FOREIGN PATENT DOCUMENTS

| | | |
|---|---|---|
| CN | 101127937 A | 2/2008 |
| CN | 101867738 A | 10/2010 |
| WO | 2001069831 A2 | 9/2001 |
| WO | WO 2008033719 A1 | 3/2008 |

OTHER PUBLICATIONS

Anonymous, "Digital Video Broadcasting (DVB); Framing Structure, Channel Coding and Modulation for Digital Terrestrial Television", European Telecommunications Standards Institute and European Broadcasting Union, Document ETSI EN 300 744, V1.6.2, Oct. 2015, 66 pages.

Anonymous, "TV Input Framework—Android Open Source Project", web.archive.org/web/20170710141801/https://source.android.com/devices/tv/, Mar. 27, 2017, 17 pages.

Anonymous, "Digital Video Broadcasting (DVB); Frame Structure Channel Coding and Modulation for a Second Generation Digital Terrestrial Television Broadcasting System (DVB-T2)", European Telecommunications Standards Institute and European Broadcasting Union, Document ETSI EN 302 755, V1.4.1, Jul. 2015, 188 pages.

Anonymous, "Vbox home TV Gateway, Xti Product Family: User Manual", VBox Communications, Document Version: 2.02, Product Version: 2.57, Apr. 2017, 92 pages.

Anonymous, "HDMI (High-Definition Multimedia Interface)", Wikipedia, web.archive.org/web/20171024080244/https://en.wikipedia.org/wiki/HDMI, Oct. 24, 2017, 31 pages.

Anonymous, "Fritz! WLAN Repeater DVB-C", AVM Computer Systeme Vertriebs GmbH, https://avm.de/produkte/fritzwlan/fritzwlan-repeater-dvb-c/, Jun. 6, 2017, 3 pages.

Anonymous, "ATSC Standard: Physical Layer Protocol", Advanced Television Systems Committee (ATSC), Document A/322:2020, Jan. 23, 2020, 263 pages.

* cited by examiner

METHODS FOR PROCESSING AUDIOVISUAL STREAMS AND CORRESPONDING DEVICES, ELECTRONIC ASSEMBLY, SYSTEM, COMPUTER READABLE PROGRAM PRODUCTS AND STORAGE MEDIA

This application claims the benefit, under 35 U.S.C. §371 of International Application PCT/EP2019/055018 filed Feb. 28, 2019, which was published in accordance with PCT Article 21(2) on Sep. 6, 2019, in English, and which claims the benefit of European Patent Application No. 18305227.3, filed Mar. 2, 2018.

1. TECHNICAL FIELD

The present disclosure relates to the field of communication devices adapted for processing audiovisual streams, notably analog audiovisual streams received from a communication network. Methods for processing audiovisual streams and corresponding signal, devices, electronic assembly, system, computer readable program products and computer readable storage media are described.

2. BACKGROUND ART

Local or domestic environments often encompass many communication devices, for processing (for instance acquiring, receiving, transmitting and/or rendering) an audio and/or video content. Such communication devices can include devices comprising at least one tuner, also called here after tuning devices, like set-top-boxes (STB), or TV sets. The audio and/or video contents are sometimes received from an external source via an analog interface (for instance a RF interface like an antenna wall socket). In the field of LAN data Networks, the use of high-speed wireless solutions (like WIFI based solutions or Power Line Communication (PLC)) adapters enables to avoid the constraint for a communication device of being close to the network interface inside the local environment. However, such solutions do not provide enough bandwidth for being adapted to the transmission of an analog signal data contents comprising a plurality of audio and/or video streams, like TV programs for instance. Thus, in a domestic environment, tuning devices (like TV, some video player and/or some Set Top Box) still need to be close to an analog wall-socket to be able to receive the analog signal. For instance, for broadcast TV programs received via an antenna, the tuning device needs to be connected, via a wired connection like a cable, to the antenna. Some solutions have been implemented that enable to get antenna streams remotely, often by converting analog streams into IP streams.

However, such solutions are not often not transparent to a user and thus may be considered as not user-friendly. So, there is need for a solution that enhance the user experience of a tuning device.

3. SUMMARY

The present principles enable at least one of the above disadvantages to be resolved by proposing a method implemented in an electronic device, the method comprising:
receiving, from a first network, an input signal conveying a plurality of audio and/or video channels;
sending, on a second network, a first signal comprising a first digital stream conveying a first audio and/or video channel comprised in said input signal and at least one other digital stream requiring less bandwidth than a digital stream conveying an audio and/or video channel of said input signal.

Notably, some embodiments of the present disclosure concern a method comprising:
receiving, from a first network, an input signal conveying a plurality of audio and/or video channels;
sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel and requiring less bandwidth than a digital stream conveying said other second audio and/or video channel of said input signal.

The input signal can be an analog signal.

According to another aspect, the present disclosure also concerns a method, implemented in an electronic device, said method comprising:
receiving, via a first network, a first digital signal comprising a plurality of streams, at least one of said streams conveying an audio and/or video channel,
converting said first digital signal to an output signal;
outputting said output signal to a tuning device coupled to said output device;
upon obtaining a channel identifier representative of a tuning performed by said tuning device, sending a channel change request via said first network, said channel change request comprising said channel identifier, to a transmitter of said first digital signal.

The output signal can be an analog signal.

4. LIST OF DRAWINGS

The present disclosure can be better understood, and other specific features and advantages can emerge upon reading the following description, the description referring to the annexed drawings wherein.

Figure 1A:
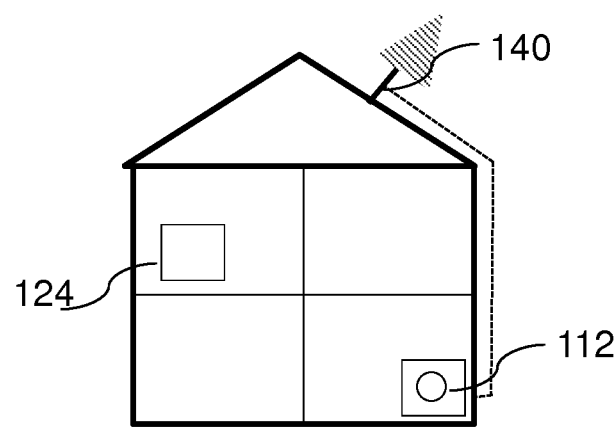
FIG. 1A shows an example of a domestic environment.

It is to be noted that the drawings illustrate exemplary embodiments and that the embodiments of the present disclosure are not limited to the illustrated embodiments. Notably, as obvious for the one of the skills in the art, the different embodiments illustrated by FIGS. 2A to 2D can also be implemented in a system comprising several tuning devices as illustrated by FIG. 1C, even if for simplicity purpose, FIGS. 2A to 2D only show a single tuning device, as in the first exemplary system illustrated by FIG. 1B.

5. DETAILED DESCRIPTION OF THE EMBODIMENTS

The invention relates to the technical field of communication systems adapted to receive and process signals, notably analog signals. Such a communication system can comprise at least one communication device, notably a communication device adapted for transmitting and/or receiving a stream, like an analog stream, notably an analog audiovisual stream. For instance, the communication system can comprise at least one communication device coupled to an analog wall socket (like an antenna wall socket). The communication system can also comprise at least one communication device integrated in or coupled to a tuning device, like a TV set, some video player or some set-top-box (STB).

Herein, the term 'coupled' is defined to mean "directly connected to" or "indirectly connected with, through one or more intermediate components". Such intermediate components may include both hardware-based components and software-based components.

The signals can be input to the communication system via an interface. For instance, an analog signal an be input thanks to an analog interface like a cable interface and/or an aerial interface (like radio frequency (RF) signals), enabling the communication system to receive analog signals from a broadcast network. Examples of cable interface include cable interfaces of Digital Video Broadcasting Cable Digital Video Broadcasting (DVB-C) or (DVB-C2), Terrestrial Digital Video Broadcasting (DVB-T) or DVB-T2, or Digital Video Broadcasting for satellite (DVB-S/DVB-S2), or cable interfaces of Advanced Television Systems Committee (ATSC) type, for instance ATSC 3.0, or Integrated Services Digital Broadcasting Terrestrial (ISDB-T) notably for Japan or Brazil) and. Such cable interfaces transmit an analog signal (that is to be transformed into a digital signal at a later stage). At least some embodiments of the present disclosure relate more specifically to communication systems comprising an electronic device equipped with an analogic tuner (like a TV set, a video player, or an analog or digital STB equipped with an analogic tuner). The analog signal can be for instance an audiovisual signal comprising several analog streams, each analog stream conveying one or more audiovisual channels (like a TV channels), eventually multiplexed. Notably, some embodiments of the present disclosure can allow to install a tuning device in a domestic environment without the constraint of adding a wired connection for the tuning device to be connected to an analog wall socket (like an analog TV wall socket). Consequently, as illustrated by FIG. 1A, at least some embodiments of the present disclosure can enable a user, in a domestic environment, to locate a tuning device 124 in a deported position, compared to a position (or location) of an antenna wall socket 112 adapted to receive a plurality of audiovisual streams from an antenna 140 located in the domestic environment. The deported position can be for instance a location more adapted to the needs of the user.

Figure 1B:
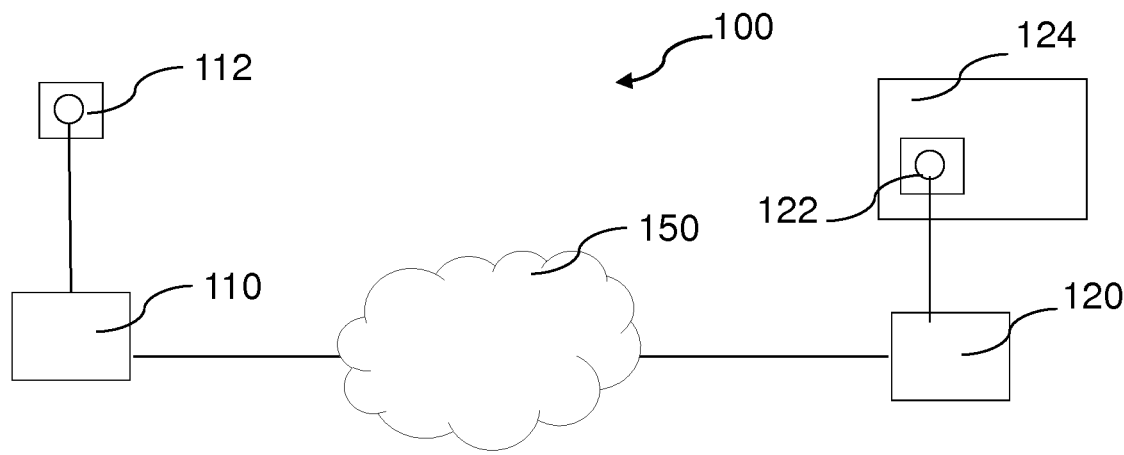
FIG. 1B shows a first exemplary communication system comprising a unique tuning device according to an embodiment of the present disclosure.
Figure 1C:
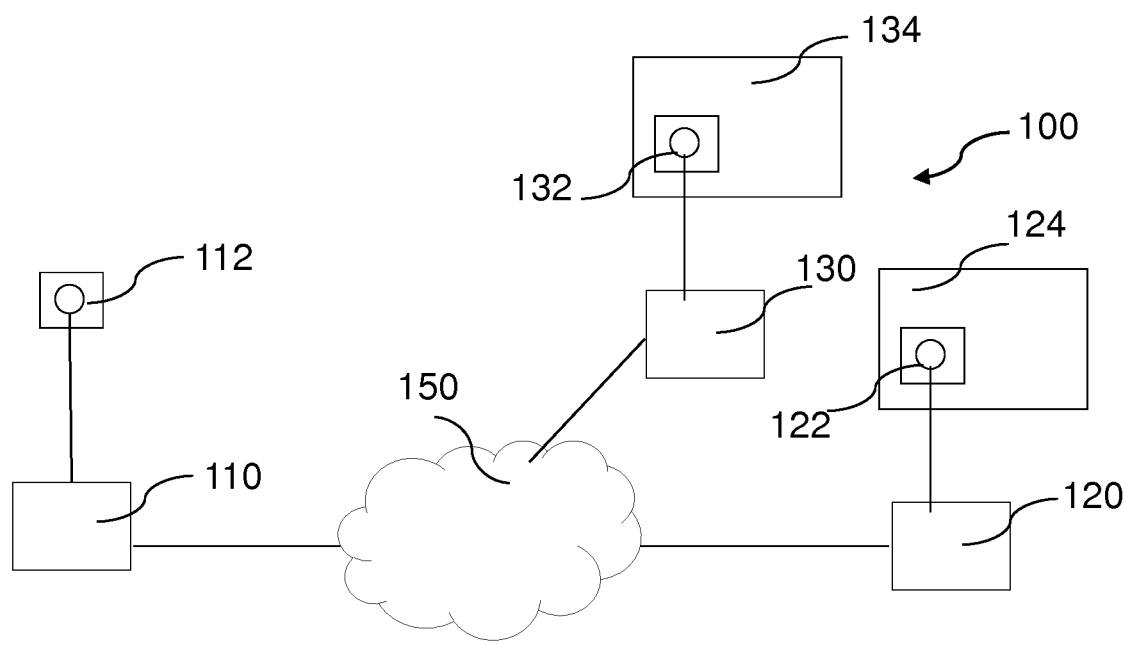
FIG. 1C shows a second exemplary communication system comprising several tuning devices according to an exemplary embodiment of the present disclosure.

FIGS. 1B and 1C each illustrates a communication system 100 adapted to implement at least one embodiment of the present disclosure. In the illustrated embodiment, the communication system 100 is in a domestic environment, like a home environment. The communication devices of the communication system can exchange data inside a communication network, for instance a local area network (LAN), thanks to wired communication interfaces (like Ethernet interface or interface based on Power Line communication (PLC) technology and/or wireless communication interfaces, like WIFI® interfaces. The communication system comprises at least one input device 110 (also called herein "transmitting adapter", "input adapter" or "Analog to Data Adapter") and at least one output device 120, 130 (also called herein "receiving adapter", "output adapter" or "Data to Analog Adapter" or "Tuning Device Adapter").

FIG. 1B illustrates an exemplary case where an input device 110 is associated (for exchanging data) with a single output device 120 coupled to a tuning device 124. FIG. 1C illustrates an exemplary case where an input device 110 is associated with several output devices 120, 130, each output device 120, 130 being coupled respectively to a tuning device 124, 134. In the embodiment illustrated by FIG. 1B, the input device 110 is connected to an analog TV output socket 112, adapted to output an analog signal comprising a plurality of audiovisual streams. Depending on embodiments, the analog signal can be diverse. Notably, the analog signal can be a signal received from a wireless broadcast network, like a Digital Terrestrial Television (DTT) network, a Satellite Network, or a signal received from a cable network. It can be a signal conveying a large amount of data, like a signal used by a High Definition (HD) or Ultrahigh Definition (UHD) high bitrate services. In the illustrated embodiment, the analog signal, being a RF signal, is received from a broadcast network via the antenna 140 (as explained in link with FIG. 1A). The output device 120 is connected, via a wired connection, to an analog-in socket 122 of the tuning device 124. The tuning device 124 can comprise or be coupled to at least one rendering module, like a display and/or a speaker. The input device 110 and the output devices 120, 130 can communicate together via a domestic or local area network (LAN) 150 accessible for instance by using WIFI or PLC communication. Such LAN network technologies can allow to make the Internet available everywhere in the home without installing new cables.

According to at least one embodiment of the present disclosure, the input device can be adapted to convert the received RF signal, coming from the antenna, to generate a digital signal being a light signal, requiring less bandwidth than the received analog input signal, and to transmit this light signal through the LAN to the output device. Only a part of the channels conveyed by the received analog input signal are conveyed by the light signal. The output device is adapted to transmit to the input device information obtained from the tuning device and representative of a channel change request performed by the tuning device. This obtained information enables the input device to tailor the light signal to the needs of the tuning device (and precisely to the channels currently rendered from the tuning device). By using the existing infrastructure of the LAN network, at least some embodiments of the present disclosure can thus allow the tuning device to be located far from the antenna wall socket. Furthermore, at least some embodiments of the present disclosure can be at least partially implemented in at least one output device externally coupled to the tuning device (for instance an output device detachably coupled via a wired connection to the tuning device). Such embodiments are thus adapted to a use with a legacy tuning device. Some other embodiments of the present disclosure can be implemented inside the tuning device itself (for instance by at least one dedicated software and/or hardware module comprised, or in other words integrated, in the tuning device).

Figure 3A:
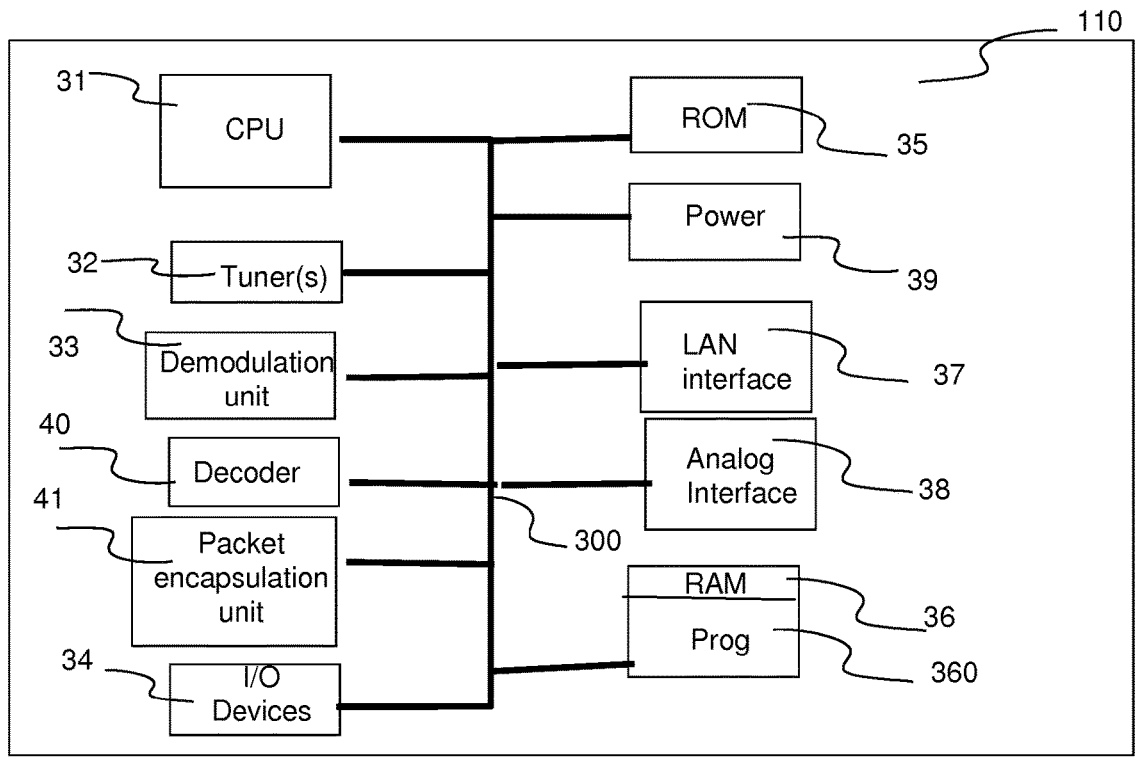
FIG. 3A illustrates an exemplary functional structure of the input device 110 of FIGS. 1B and 1C.

FIG. 3A describes an exemplary functional structure of an input device (like the input device 110 of FIG. 1B or 1C) adapted to implement the method 600 of the present disclosure, that is described later. It is to be pointed out that the elements, or module, or blocks, of the functional structure illustrated of FIG. 3A can be implemented thanks to software components of the input device and/or thanks to hardware components of the input device. At least some elements illustrated by FIG. 3A can comprise both at least one software component and at least one hardware component of the input device. In the exemplary embodiment of FIG. 3A, the input device 110 can include different devices (or modules), linked together via a communication bus 300, such as a control, data and address bus, which can also carry a timer signal. For instance, it can include one or several micro-processors 31 (or Central Processing Units (CPU)), a ROM (or «Read Only Memory») 35, a RAM (or «Random Access Memory») 36 and wired and/or wireless communication interface(s) 37, 38. Notably, the input device 110 can comprise an analog input communication interface 38, adapted to be connected, via an analog signal cable for instance, to an analog wall socket (like an analog TV wall socket) and to receive a plurality of audiovisual streams.

In the illustrated embodiment, the input device can also comprise at least one communication interface 37 providing access to the Network 150. Notably, in some embodiments, at least one of the communication interface(s) 37 of the input device can be a wireless communication interface (like a WIFI interface), configured for the reception and/or transmission of data via a wireless connection. In some embodiments, at least one of the communication interface(s) 37 of the input device 110 can be an interface with a power line network of the domestic environment, configured for the reception and/or transmission of data via the power line network. In some embodiments, at least one of the communication interface(s) 37 of the input device 110 can be a direct Ethernet interface (like a connector of "RJ45" type (where RJ stands for Registered Jack). Of course, in some embodiments, the input device can comprise several communication interfaces being either of a same type or of different types.

In the exemplary embodiment of FIG. 3A, the input device 110 can comprise at least one tuner (or tuning module) 32, adapted to select and read at least one stream amongst the plurality of streams received via the analog interface 38. For instance, the tuner 32 can be adapted to select and read a stream received on at least one given frequency and comprising one or more TV channels (like a multiplex of several TV channels). Depending on embodiments, the number of tuners included in the input device 110 can vary. An input device with several tuners can be useful for providing a user with several services at the same time, notably services involving several frequencies (like full-screen display, Picture in Picture (PIP) and video recording services being performed at the same time). Using an input device equipped with several tuners can also be useful in embodiment's where an input device can be associated with several output devices simultaneously. In such an embodiment, each tuner of the input device can be associated with a different output device for instance. Of course, the number of tuners can also have an impact on the manufacturing cost of the input device. Thus, the number of tuners present in the input device can vary upon embodiments. It can notably depend on the cost constraints and on an intended level of service. The input device can notably comprise at least one tuner 32 adapted to address a mandatory requirement, like a tuner of "TNT" type, allowing a user to get free access to broadcast TV channels.

In the exemplary embodiment of FIG. 3A, the input device 110 can also comprise at least one demodulation unit 33 adapted to demodulate the analog signals output by the tuner(s) of the input device and to send digital demodulated signals to a decoding unit 40. In the exemplary embodiment detailed, the decoding unit 40, in turns, decodes multimedia services and output TV channels. The demodulation unit 33 and/or the decoding unit 40 can comprise several modules. The input device can for instance comprise a demodulation unit comprising a demodulation module per tuner and a decoding unit comprising a decoder module per tuner.

In the exemplary embodiment of FIG. 3A, the input device can comprise a packet encapsulation unit 41, adapted for encapsulating the TV channels in IP stream adapted to be output on the LAN interface 37.

In the exemplary embodiment of FIG. 3A, the input device 110 can further comprise at least one Input/Output module 34, (like a tactile display, a switch, a led, a button, and so on). Notably, the input device can comprise an input Interface adapted to enable a user to request a channel scan on a given frequency range. In some embodiments, the frequency range can be defined at the time of the manufacturing and/or at the time of the selling of the input device. In some embodiments, the frequency range can be defined by means of the user interface, notably at the time of the scan request. The input device 110 can also comprise an input interface adapted to enable a user to establish a connection of the input device 110 with another input device (like the output device 120 or 130 of FIGS. 1B and 1C). Such an input interface can include at least one pairing button (for connection via a power line network for instance and/or for a connection via a WIFI network by using a WIFI Protected Setup (WPS) pairing for instance). The input device 110 can also comprise other communication interfaces like at least one pass-thru extra-power outlet and/or at least one pass-thru antenna outlet. Those interfaces are optional.

Each of the mentioned memories can include at least one register, that is to say a memory zone of low capacity (a few binary data) or high capacity (with a capability of storage of a whole program or of all or part of data representative of data to be calculated or displayed).

When the input device 110 is powered on, via a power supply module 39, for instance a power supply module connected to the power line network, the microprocessor 31 loads the program instructions 360 in a register of the RAM 36, notably the processes needed for performing at least one embodiment of the method 600 described herein after and executes the program instructions. According to a variant, the input device 110 can include several microprocessors.

The input device 110 of the system can be adapted to implement the method 600 of the present disclosure, in any of its embodiments.

In the exemplary embodiment illustrated in FIG. 3A, the microprocessor 31 can be configured for:
  receiving, from a first network, an input analog signal conveying a plurality of audio and/or video channels;
  sending, on a second Network, a first signal comprising a first digital stream conveying a first audio and/or video channel comprised in the input analog signal and at least one other digital stream requiring less bandwidth than a digital stream conveying an audio and/or video channel of the input analog signal.

Notably, in some embodiments of the present disclosure, the microprocessor 31 can be configured for:

receiving, from a first network, an input signal conveying a plurality of audio and/or video channels;

sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel and requiring less bandwidth than a digital stream conveying said other second audio and/or video channel of said input signal.

Figure 3B:
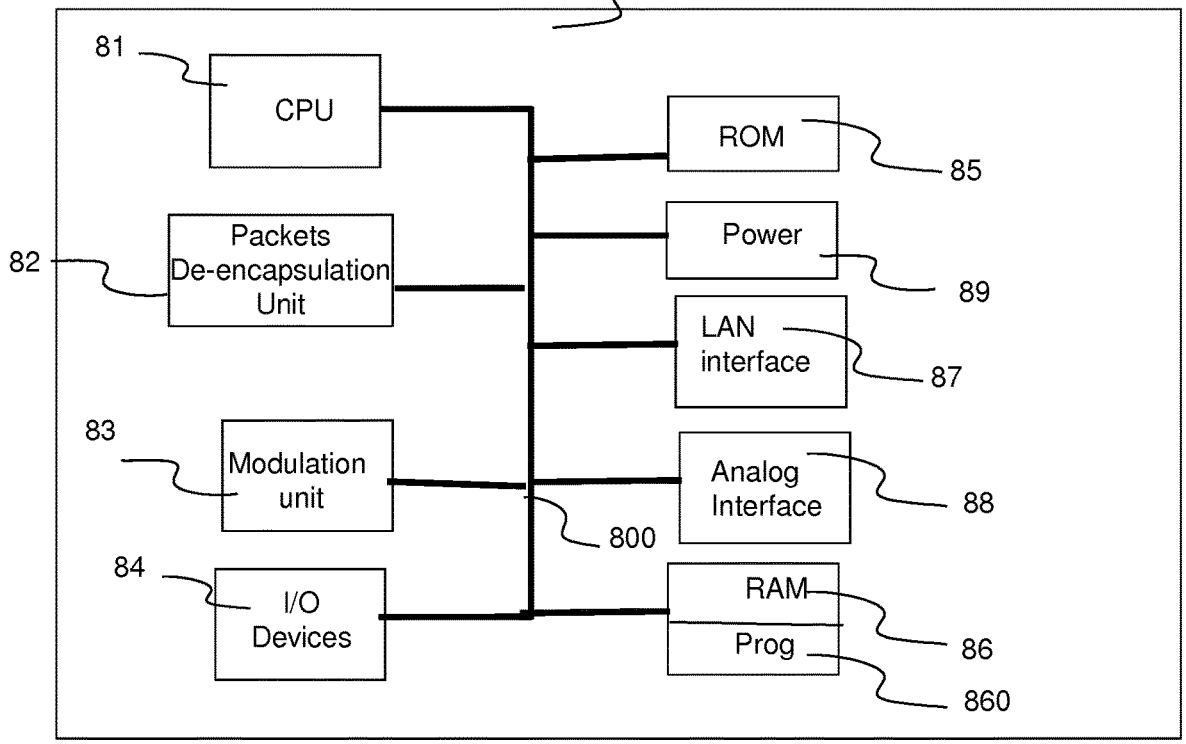
FIG. 3B illustrates an exemplary functional structure of an output device 120 or 130 of FIGS. 1B and 1C.
Figure 4:
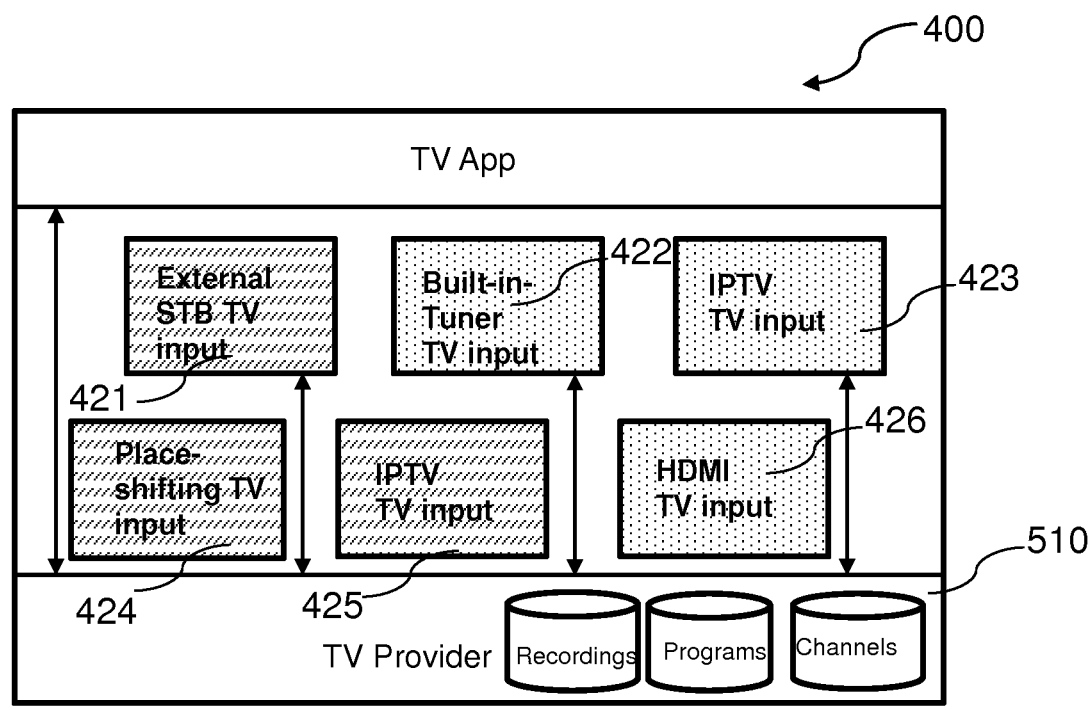
FIG. 4 illustrates a structure of a software architecture of a tuning device comprising an output device adapted to implement the embodiment of FIG. 2A.

The input signal can be an analog signal. Optionally, the input device can further comprise another wireless interface (like a WIFI interface) that can be used for a communication device (like a tablet, a personal computer (PC) and/or a smart phone to access the LAN 150 via the input device. FIG. 3B describes an exemplary functional structure of an output device (like the output device 120, 130 of FIG. 1B or 1C) adapted to implement the method 700 of the present disclosure, that is described hereinafter. It is to be pointed out that the elements, or module, or blocks, of the functional structure illustrated of FIG. 3B can be implemented thanks to software components of the output device and/or thanks to hardware components of the output device. At least some elements illustrated by FIG. 3B can comprise both at least one software component and at least one hardware component of the output device.

In the exemplary embodiment of FIG. 3B, the output devices 120, 130 can include different devices (or modules), linked together via a data and address bus 800, which can also carry a timer signal. For instance, they can include one or several micro-processors 81 (or Central Processing Units (CPU)), a ROM (or «Read Only Memory») 85, a RAM (or «Random Access Memory») 86 and wired and/or wireless communication interface(s). Notably, the output devices 120, 130 can comprise an analog output communication interface 88, adapted to be connected, via an analog cable for instance or by aerial means, to an analog input socket 122 of a tuning device 124 and to transmit to the tuning device 124 one or more audiovisual stream(s).

In the illustrated embodiment, the output device 120, 130 can also comprise at least one LAN communication interface providing access to the domestic Network 150. Notably, the output device can comprise at least one LAN interface 87, being for instance a wireless communication interface (like a WIFI interface) and/or a communication interface with a power line network of the domestic environment, and/or a direct Ethernet interface (like a connector of "RJ45" type). Of course, in some embodiments, the output device can comprise several communication interfaces being either of a same type or of different types.

In some embodiments, the output device can comprise at least one other communication interface. For instance, it can comprise a High-Definition Multimedia Interface (HDMI), enabling reception and/or transmission of video data, for instance an HDMI socket, or a socket providing a feature known as "ARC-IN" feature.

In the exemplary embodiment of FIG. 3B, the output device 120 can also comprise at least one packets de-encapsulation unit 82, adapted to process IP signal received from the LAN interface 87 to de-encapsulate data contained in the packets of the IP signal. The output device 120 can also comprise a modulation Unit 83 adapted to modulate the signals output by the packets de-encapsulation unit 82 and to generate an analog signal adapted to be output via the analog interface 88.

In the exemplary embodiment of FIG. 3B, the output device 120 can further comprise at least one Input/Output module 84, (like a tactile display, a switch, a led, a button, a sensor, and so on).

Notably the output device can comprise at least one sensor adapted to capture an audio and/or visual event (like a signature of an audiovisual stream rendered from a tuning device coupled to the output device as explained hereinafter). The at least one sensor can be a microphone, an image capturing module, and/or a photo sensor, adapted to sense a color change or a change of lighting conditions. The output device 120, 130 can also comprise an input interface adapted to enable a user to establish a connection of the output device 120, 130 with an input device (like the input device 110 of FIGS. 1B and 1C). Such an input interface can include at least one pairing button (for a connection via a power line network and/or for a connection via a WIFI network by using a WIFI Protected Setup (WPS) pairing for instance). The output device 120, 130 can also comprise at least one other communication interface, like at least one pass-thru extra-power outlet and/or at least one pass-thru antenna outlet. Those interfaces are optional. In some embodiments, the output device can optionally comprise a WIFI interface that can be used for a communication device (like a tablet, a personal computer (PC) and/or a smart phone to access the LAN 150 via the output device.

Each of the mentioned memories can include at least one register, a memory zone of low capacity (a few binary data) or high capacity (with a capability of storage of a whole program or of all or part of data representative of data to be calculated or displayed).

When the output device 120, 130 is powered on, via a power supply module 89, for instance a power supply module connected to the power line network, the microprocessor 81 loads the program instructions 860 in a register of the RAM 86, notably the processes needed for performing at least one embodiment of the method 700 described hereinafter, and executes the program instructions.

According to a variant, the output device 120, 130 can include several microprocessors.

The output device 120, 130 of the system is adapted to implement the method 700 of the present disclosure, in one of its embodiments.

In the exemplary embodiment illustrated in FIG. 3B, the microprocessor 81 can be configured for:

receiving, via a first interface, a first digital signal comprising a plurality of streams, at least one of the streams conveying an audio and/or video channel;

converting the first signal to an output analog signal;

output the output analog signal to a tuning device coupled to the electronic device;

upon obtaining a channel identifier representative of a tuning performed by the tuning device, sending a channel change request via the first interface, the change request comprising the channel identifier, to a transmitter of the first signal.

Some embodiments regarding methods of present disclosure are described hereinafter.

Figure 6:
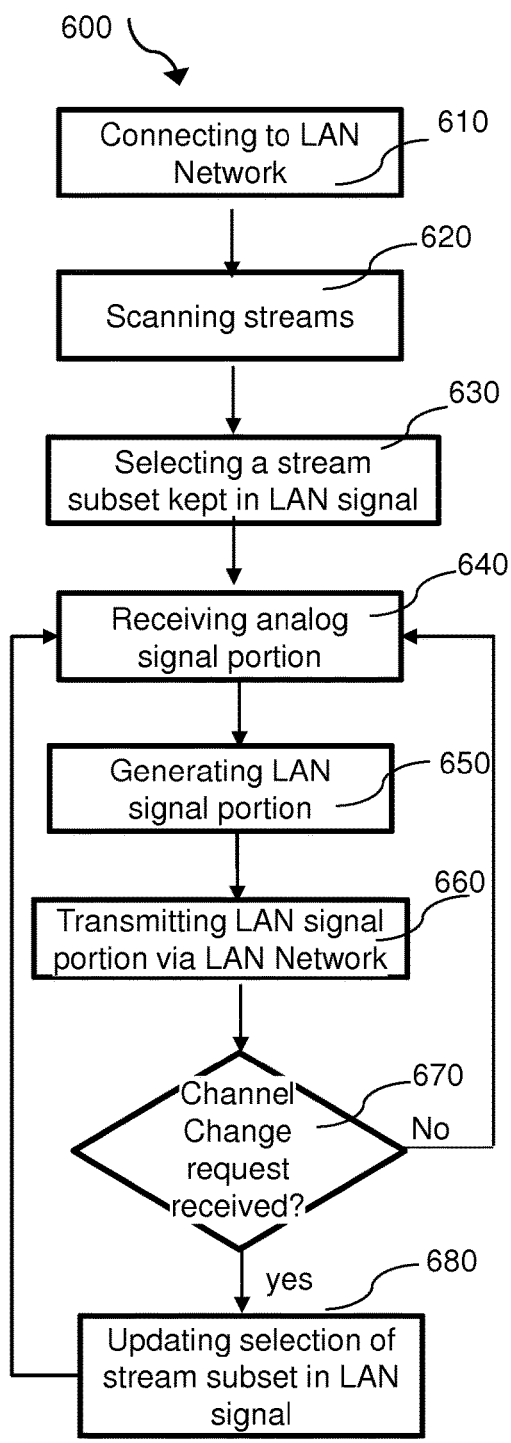
FIG. 6 illustrates an embodiment of one of the methods of the present disclosure performed, for instance, in the input device 110 of FIGS. 1B and 1C.

FIG. 6 shows an exemplary embodiment of the method 600 of the present disclosure, implemented in the input device (or transmission device) 110 of FIGS. 1B and 1C.

According to the illustrated embodiment, the method comprises connecting 610 the input device 110 to the LAN 150. The connecting 610 can be performed differently according to embodiments and notably depending on the LAN interface used. For example, it can be performed according to a WIFI standard, by sending WFS signal for instance, or it can imply a pairing with another communication device (like the output device 120, 130).

The connecting 610 can be performed automatically or upon receiving a user request from an input interface of the device 110 and/or from a communication interface of the input device.

In some embodiments, once connected to the LAN, the input device and the output device can discover each other by exchanging communications, for example through multicast communications and/or communications compliant with the Internet Group Management Protocol (IGMP) (if the LAN network is an IP type network).

According to embodiments, the connecting 610 can be performed before, at a moment of, or after a coupling of an analog interface of the input device to an external analog socket (like an antenna-out socket such as an antenna wall socket).

Once the analog interface of the input device is coupled, via the analog interface, to the analog socket, the method can comprise performing a channel scan (or in other words scanning 620 the channels received on at least one given frequency range). This scan can be optional. Indeed, in some embodiments, the scan can be needed each time a software application implementing this method is launched, and thus can be performed systematically (and notably automatically). In other embodiments, the channel frequency can already be known and thus a scan can be omitted. Notably, for later uses of the method by the software application, a scan can be either performed automatically or only upon receiving a channel scan request from a user (via an input module (like a button) or a communication interface of the input device for instance). Notably, the channel scan request can be received through the LAN interface from an output device 120, 130.

Depending on embodiments, the scan 620 can be performed before or after connecting the input device to the LAN network. It can also be performed in parallel to the connecting 610.

In the embodiment of FIG. 6, the method 600 comprises receiving 640 an input analog signal comprising a plurality of streams from the analog interface. In the exemplary embodiment described, the input analog signal comprises a plurality of streams, each stream corresponding to one or more TV video channel(s) (or program(s)) with its/their associated metadata. As illustrated by FIG. 6, upon receiving the input analog signal, the method 600 can comprise generating 650 a signal (called hereinafter LAN signal) adapted to be transmitted on the LAN 150 from the analog input signal being received.

In the detailed exemplary embodiment, the generating can notably comprise tuning the received input analog signal, demodulating the tuned signal and encapsulating data of the demodulated signal in IP packets.

As pointed out in the background section, transmitting an analog signal often requests a large bandwidth. As an example, the French DTT Network has frequencies in the [470 MHz; 694 MHz] and thus require a bandwidth of at least 224 MHz. Some domestic network, like the LAN network 150, may not have enough bandwidth to forward an input signal corresponding to channels of all the frequency range to the tuning device. Thus, it is not possible using the LAN to convey all the data present in the signal received from the analog wall socket to the tuning device.

So, according to the embodiment illustrated by FIG. 3A, the method can comprise generating 650 a LAN signal more adapted to the bandwidth constraint of a LAN network.

The generating 650 can comprise demultiplexing at least one of the streams of the input analog signal. This demultiplexing is optional, depending notably on the received input signal. The generating 650 can further comprise decoding at least one of the streams of the input analog signal and packing at least some of the decoded streams into a LAN signal. In the exemplary embodiment described, the LAN signal comprises a same number of streams (or IP ports) as the input analog signal. However, only a subset of the streams of the input analog signal is transcoded in the LAN signal. The generating 650 can notably comprise filtering the channels or multiplex of channels of the input analog signal, to include, in the LAN signal, only a subset of the channels that are present in the analog signal. For instance, only one channel or one multiplex channel originally included in the analog signal can be included in the LAN signal. One or several of the other streams of the LAN signal, not conveying a channel being part of the subset, can be light stream(s), with a lower bitrate than the channel received by the input device. For instance, a light stream can convey a degraded version of an originally received channel, like a channel encoded in a lower definition than in the analog stream originally received. Such a lower version can be generated by the input device, thanks to some transcoding means for instance. In some embodiments, a light stream can convey only (or mostly) the audio part or the video part of an analog stream originally received. In some embodiments, a light stream can convey only (or mostly) stuffing data. In such embodiments, at the point of view of a user of the tuning device, a light stream can be considered as a "fake stream" as it does not convey the content that the user expects. The stuffing data can include padding data, like randomly generated data, and/or at least one predefined bit pattern (including for instance an audio and/or visual signature of a specific channel.) The predefined bit pattern can be different for each channel included in the input analog signal. Indeed, as it will be explained in more details in link with the method 700 (illustrated by FIG. 7) that can be implemented for instance in an output device coupled to a tuning device, the predefined bit pattern can be used for identifying a channel currently rendered on the tuning device, in order for the output device to generate a channel change request.

It is to be pointed out that, depending on embodiments, the ordering of the digital streams in the LAN signal can be the ordering of the analog streams, corresponding to the same channel(s) of the input analog signal or can be a different ordering than the one of the input analog stream (for instance the analog stream conveying "channel 3" can be the third stream of the input analog signal while the information relating to "channel 3" can be conveyed by the first stream (port 1) of the LAN signal). An embodiment where the ordering is preserved between the input analog signal and the LAN signal can sometimes lead to a simpler implementation than an embodiment not preserving the ordering of the channels.

In the illustrated embodiment, the metadata associated with each stream of the input analog signal not kept in the LAN signal are however included, together with the stuffing data, in one of the streams of the LAN signal. With the example above where "channel 3" is conveyed by the third stream of the input analog signal and should be conveyed (if kept) by the first stream of the LAN signal, the metadata of the third stream of the input analog TV signal can be comprised in the metadata of the first stream LAN signal even if the first stream is a light stream not conveying channel 3. The metadata kept in a stream can include for instance the channel number, some data usable by an Electronic Program Guide (EPG), and/or some teletext data.

Table 1 below gives an example of an input analog signal, comprising 4 multiplex streams, while Table 2 below presents an example of a LAN signal that can be generated from the exemplary input analog signal of Table 1 (for the exemplary case where a single stream or channel (channel 1.2) is kept in the LAN signal).

TABLE 1

| Input analog signal | Frequency 1 = Multiplex 1 of Channels | Channel 1.1 (data + metadata) |
| --- | --- | --- |
| | | Channel 1.2 (data + metadata) |
| | Frequency 2 = Multiplex 2 of Channels | Channel 2.1 (data + metadata) |
| | | Channel 2.2 (data + metadata) |

TABLE 2

| LAN signal | Port 1 = metadata of channel 1.1 + stuffing data |
| --- | --- |
| | Port 2 = Channel 1.2 (data + metadata) |
| | Port 3 = metadata of channel 2.1 + stuffing data |
| | Port 4 = metadata of channel 2.2 + stuffing data |

The method 600 can also comprise transmitting 660 the LAN signal via the LAN network.

Even if illustrated by two different consecutive steps in FIG. 6, the generating and the transmitting can obviously be performed concurrently (a first portion (already generated) of the LAN signal being transmitted while a second part is being generated).

The method can comprise, for instance before the generating 640, selecting 630 a subset of channels to be kept in the LAN signal. The number of channels to be kept in the LAN signal can vary between 1 to N (with N being an integer strictly greater than 1) depending on embodiments. The selecting can notably depend on the number of tuners of the tuning module of the input device and of the previously performed selecting (having an impact on the current frequencies selected by those tuners). When the input device is switched on, the initial subset of kept channels can be determined by the current position of the tuner(s) of the tuning module(s) and/or be chosen to include one or more default channel(s). At least one further selecting can be performed in response to a channel change request received from the output device.

According to the exemplary embodiment of FIG. 6, the method can comprise tracking 670 a receiving of a channel change request via the LAN interface. For instance, a channel change request can be initiated (thanks to a Remote-Control device) by a user of a tuning device coupled to an output device that receives the LAN signal. The channel change request can be detected by the output device which in turns transmits a channel change request to the input device via the LAN. It is to be pointed out that in the present disclosure the term "channel change request" includes any request relating to a channel update, including for instance request for channel update concerning a main display, request for channel update concerning a Program in Program (PIP) functionality or request for channel update concerning an on-going or upcoming recording. While no channel change request is received, the subset of channels kept from the input analog signal to the LAN signal can stay unchanged.

Upon receiving a channel change request, the method can comprise updating 680 the subset of kept channels. The updating 680 can notably take into account an information comprised in the channel change request. For instance, in embodiments where the channel change request includes at least one channel identifier, the subset of kept channels can be updated to include channel(s) designated by the channel identifier(s) included in the channel change request. At the opposite, at least one channel that was previously kept in the LAN signal can be removed from the subset of kept channels.

It is to be pointed out that the number of kept channels (and thus the size of the subset of kept channels) can vary upon the time. For instance, in some embodiments a single stream can be kept when the input device is switched on, while upon receiving a channel change request containing several channel identifiers, the subset can be modified to include all the several channels identified in the channel change request (thus a size of the subset is increased). The subset can also be modified to include only a part of the several channels identified in the channel change request (depending for instance of a number of tuners of the input device).

Table 3 below gives an example of a modified LAN signal (compared to the LAN signal of Table 2) after receiving a request for changing from channel 1.2 to channel 2.1).

TABLE 3

| Modified LAN signal | port 1 = metadata of channel 1.1 + stuffing data |
| --- | --- |
| | port 2 = metadata of channel 1.2 + stuffing data |
| | port 3 = Channel 2.1 (data + metadata) |
| | port 4 = metadata of channel 2.2 + stuffing data |

In the exemplary embodiment of FIG. 6, it is considered, for simplification purpose, that a tracking 670 of a reception of a channel change request is performed after transmitting 660 a portion of a LAN signal to the LAN. However, the tracking can be performed differently upon embodiments. It can notably be performed periodically, or after each reception of a portion of an input analog signal, upon generating the LAN signal portion and/or after transmitting a portion of a LAN signal. It can also be performed at any stage of the method (once the input device is connected to the LAN network of course). Notably, in some embodiments, receiving a channel change request can generate a hardware interruption followed by an immediate processing of the request (and the update of the subset of kept streams).

Embodiments of a method implemented in a transmitter device, like at the antenna side with reference to FIGS. 1B and 1C, have been described above. Embodiments of a corresponding method implemented in a receiver device (also called herein output device), at the tuning device side (with reference to FIGS. 1B and 1C) are described below.

Figure 7:
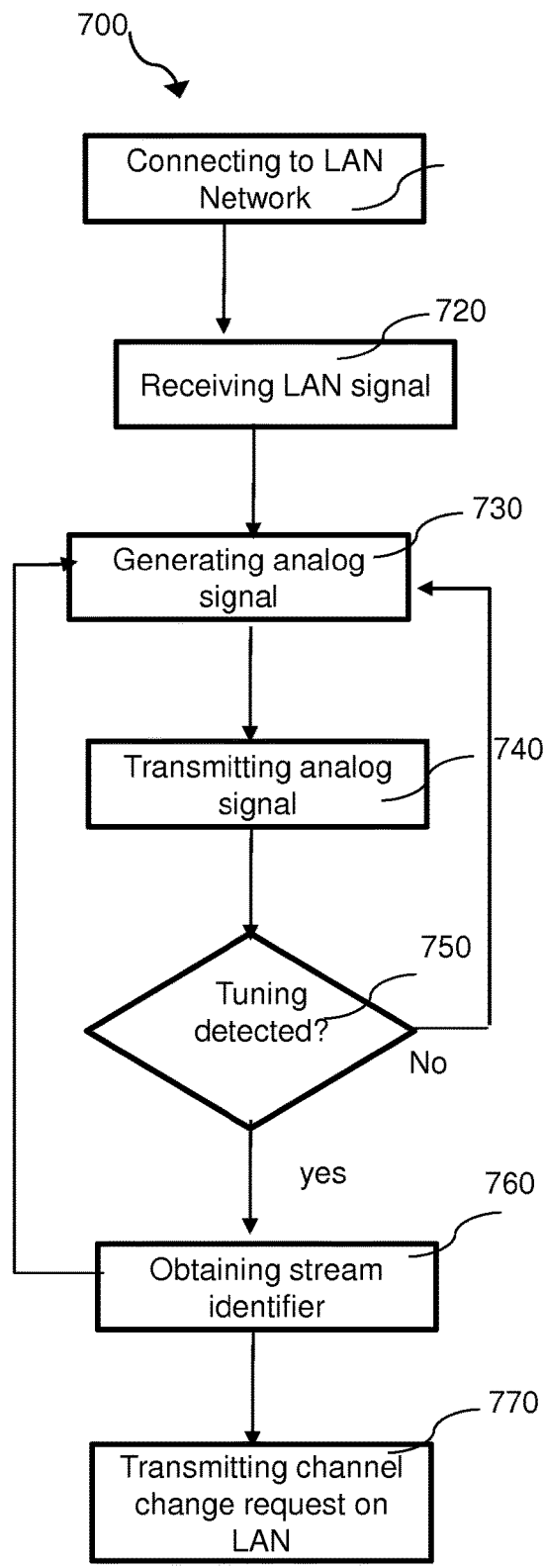
FIG. 7 illustrates an embodiment of one of the methods of the present disclosure performed, for instance, in an output device 120 or 130 of FIGS. 1B and 1C.

FIG. 7 shows an exemplary embodiment of the method 700 of the present disclosure, implemented in an output device, like the output device 120, 130 of FIGS. 1B and 1C. According to the illustrated embodiment, the method comprises connecting 710 the output device 120, 130 to the LAN 150. The connecting 710 of the output device 120, 130 with the input device 110 can be performed similarly to what has already been described regarding the connecting 610 of the input device 110 with the output device 120, 130.

According to different embodiments, the connecting 710 can be performed before, at a moment of, or after a coupling of an analog interface of the output device to an external analog socket (like an external RF socket such as an antenna-in socket of a tuning device like a TV set, a video player, or a STB).

Once the output device is connected to the LAN network, the method can comprise receiving 720 a LAN signal from the LAN network 150. The LAN signal can comprise several streams. Notably, when the LAN signal is transmitted by an input device implementing the method 600 of the present disclosure, it can comprise some stream(s) with video channels obtained from an input analog signal, upcoming from an antenna for instance, and one or several light stream(s) each comprising stuffing data and, optionally, at least some metadata of a channel present in a stream obtained from the same input analog signal. The method 700 can comprise generating 730 an output analog signal from the received LAN signal, each stream of the generated output analog signal corresponding to a stream of the received LAN signal. More precisely, the generating 730 can comprise unpacking at least some of the streams of the LAN signal and encoding the unpacked streams in an output analog signal. The generating 730 can further comprise multiplexing at least one of the encoded streams for forming the output analog signal. This multiplexing is optional.

It is to be pointed out that, depending on embodiments, the ordering of the streams of the output analog signal can be the same ordering as the one of the streams of the LAN signal or can be different (similarly to what have been detailed hereinabove regarding the ordering of streams inside the LAN signal compared to the ordering of streams of the input analog signal).

Table 4 below gives an example of the output analog signal (issued from the LAN signal of Table 2 and thus from the input analog signal of table 1) generated by the output device.

TABLE 4

| Output analog signal | Frequency 1 = Multiplex 1' of Channels | metadata of channel 1.1 + stuffing data Channel 1.2 (data + metadata) |
|---|---|---|
| | Frequency 2 = Multiplex 2' of Channels | metadata of channel 2.1 + stuffing data metadata of channel 2.2 + stuffing data |

As illustrated by FIG. 7, upon generating the output analog signal, the method 700 can comprise transmitting 740 the generated output analog signal, via the analog interface of the output device, to the tuning device.

Even if illustrated by two different consecutive steps in FIG. 7, the generating 730 and the transmitting 740 can obviously be performed concurrently, (a first portion (already generated) of the output analog signal being transmitted while a second part is being generated.

In some embodiments, the LAN signal (and thus the output analog signal) only comprises a subset of the channels of the input analog signal (as in the exemplary cases of Tables 1 to 4). A rendering module (like a display or a speaker) coupled to, or integrated in, a tuning device that receives the output analog signal, will thus only be able to restitute some of the channels originally present in the input analog signal. More precisely, the rendering module will be able to render a channel kept in the output analog signal (and thus in the LAN signal) while, at the opposite, a rendering of an analog stream obtained from a light stream will lead to a rendering of the replacement data present in the light stream, like a degraded version of the content, an audio part with no corresponding video part, a video part with no corresponding audio part, and/or stuffing data. Thus, a mechanism can be implemented to tailor the selection of the kept channel(s) (or in simpler words, to update the subset of kept channels) according to the tuning performed by the tuning device. The method 700 can thus comprise tracking 750 an occurrence of a tuning performed by a tuning device (like a tuning initiated by a request of a user of the tuning device for instance, thanks to an input user interface of the tuning device or thanks to a remote control coupled to the tuning device). When a tuning is detected, the method 700 can comprise obtaining 760 at least one identifier of a channel that is to be rendered according to the tuning made, and which thus should be present (or kept) in the LAN signal (and thus in the output analog signal). As illustrated by FIG. 7, the method can comprise generating and transmitting 770 a channel change request, via the LAN network 150, to the input device, the channel change request comprising at least one identifier of the at least one channel that is to be present of the LAN signal. In the exemplary embodiment of FIG. 7, it is considered, for simplification purpose, that a tracking 750 of a tuning done by the tuning device is performed after transmitting 740 a portion of the output analog signal to the tuning device. However, the tracking can be performed differently depending on embodiments. It can notably be performed periodically, or after each reception of a portion of the LAN signal, upon generating a portion of the output analog signal and/or after transmitting a portion of the output analog signal to the tuning device. It can also be performed at any stage of the method. For instance, in some embodiments, the occurrence of a tuning can be detected via a hardware interruption. FIGS. 2A to 2D, 4 and 5 illustrate several embodiments, regarding the tracking 750 and the obtaining 760.

Figure 2A:
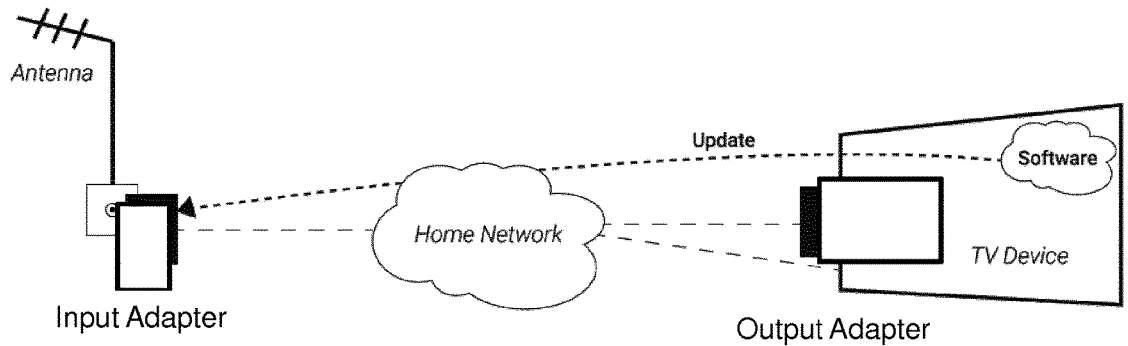
FIGS. 2A, 2B, 2C and 2D illustrate several embodiments adapted to be implemented in the first exemplary system of FIG. 1B.

As illustrated by FIG. 2A, in some embodiments, notably embodiments where the output device is integrated in the tuning device, the tracking can rely at least partially on a monitoring software application, launched on the tuning device. The application can be adapted to interact with a user (thanks to an input/output user interface of the tuning device for instance), or can be an application executed transparently to a user (without any interaction with a user or with very few interactions with the user), like a background monitoring application. Such an embodiment is more adapted to be implemented in an input device integrated to a tuning device, or at least adapted to communicate with a monitoring application executed on the tuning device. Thus, some embodiments may be incompatible with some tuning devices, and especially with some legacy tuning devices. Depending on embodiments, the application can be an application permanently present, provided with the tuning device, or an application launchable on demand on the tuning device or an application downloadable to the tuning device (like an application accessible from an "App store" and adapted to the operating system of the tuning device, when the tuning device is adapted to access such "App store" through an Internet Protocol (IP) network).

In the exemplary embodiment of FIG. 2A, the application is a background-service launched on startup of the tuning device and running continuously as a background task while the tuning device is operating. The application can for instance monitor channel change requests received by the tuning device by tracking events related to channel change requests in log files of the tuning device. Notably, in some tuning devices, each channel change can be associated with a report in a log file including indication of the requested channel.

In a variant, adapted notably to an implementation with an android TV Set, the monitoring application can be a "TV source plugin software". As illustrated by the architectural schema 400 of FIG. 4, some android TV Operating systems can allow to implement some TV-Input modules 421, 422, 423, 424, 425, 426. TV Inputs can be native (422, 423, 426) or can be installed (421, 424, 425) via a downloaded application (like a software application obtained from an App store). In this context, the output device can be associated with a dedicated TV-Input application which, among other things, can perform a tracking of channel tuning.

Figure 2B:
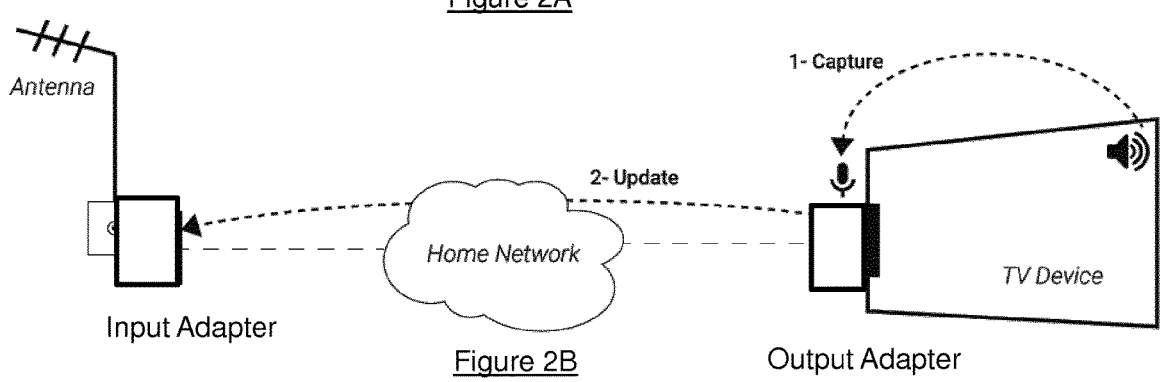
Figure 2C:
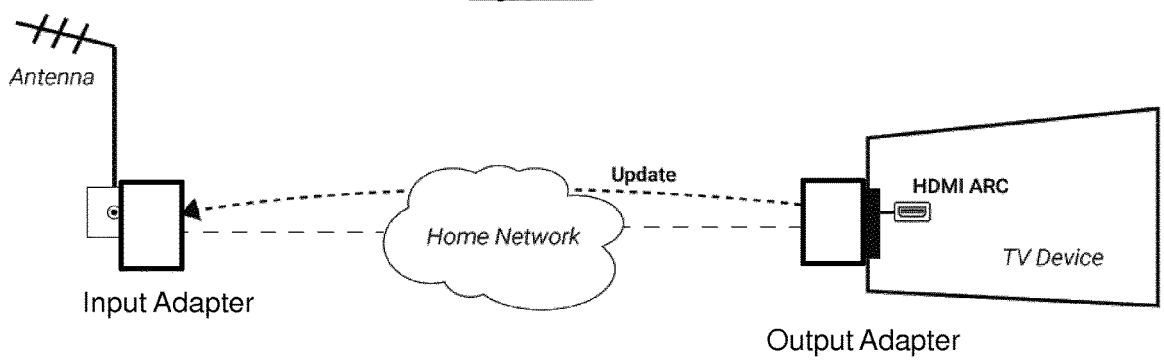
Figure 2D:
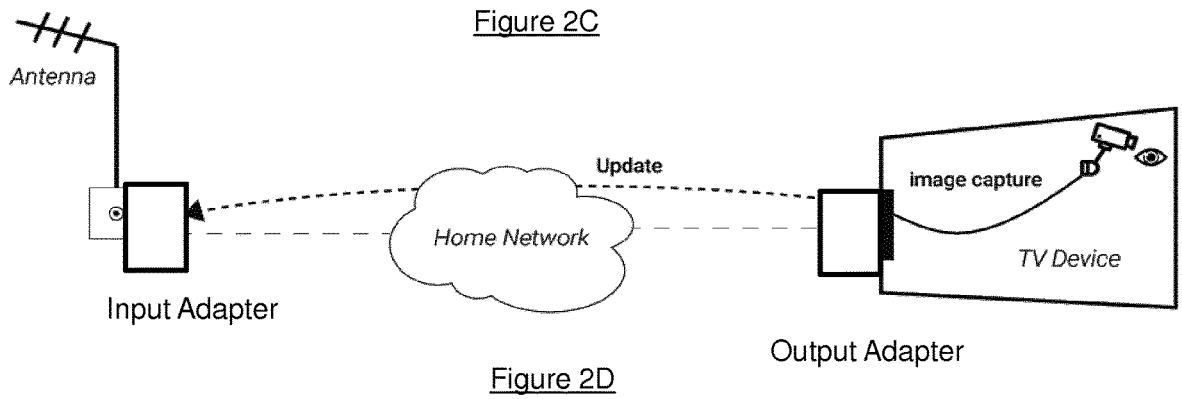

Such an embodiment can offer the advantage of relying on a standardized implementation, regarding the way of obtaining and display TV channels from a source. Notably, a third-party software can add its channels to the system without updating the manufacturer TV App. As illustrated by FIGS. 2B to 2D, other embodiments can rely on a signature embedded in the one or several streams currently rendered from the tuning device (for instance on a display and/or by a speaker coupled to or integrated in the tuning device). Such embodiments lead to a transitory rendering of information conveyed by a light stream (as the tuning is only detected once the analog stream corresponding to the light stream is rendered).

The embedded signature can be different from each channel and so can be used for obtaining an identifier of a channel, uniquely identifying a channel. This identifier can be used for identifying a channel to be omitted or kept in streams of the LAN signal.

The kind of signature can differ depending on embodiments, notably it can be an audio signature (as illustrated by FIGS. 2B and 2C), a visual signature (as illustrated by FIG. 2D) or a mix of audio and visual signature.

The signature of a channel can notably be comprised in the stuffing data of a light stream of the LAN signal comprising the metadata of the channel. For instance, a stream can embed a repeated audio signature, being either audible or inaudible for human ears (like audio watermarking, ultra-sounds, or sounds having a frequency equal of higher than 20 kHz, for instance a frequency above 30 kHz). In some embodiments, the stream(s) of the LAN signal corresponding to kept channels can also embed a similar signature.

In the embodiment illustrated by FIG. 2B, when a user of the tuning device requests a channel change, the tuning device performs the channel change and thus a different channel is rendered by the tuning device. Notably, when the newly rendered stream corresponds to light stream, an audio signature is played. The output device can then obtain the audio signature currently played. In the embodiment of FIG. 2B, the obtaining can be performed thanks to an audio recording device (comprising notably a microphone) adapted to capture this signature. Depending on embodiments, it can be a human audible audio signature, or a signature inaudible for a user like an ultrasound signature.

In some embodiments where the tracking relies at least partially on a capture of an audio signature, a light stream can comprise, further to the audio signature and/or the metadata of the corresponding channel, data adapted to lead to a rendering of a textual alert message (like "Loading channel. Please make sure the audio isn't mute") to ensure the audio signature to be detectable.

In a variant, as illustrated by FIG. 2C, in some embodiments where the output device comprises an HDMI interface and is used with a tuning device providing an HDMI Audio Return Channel (ARC) feature, the audio signature can be obtained by connecting the HDMI interface to an HDMI interface of the tuning device. With the ARC feature, the audio signal received by the tuning device can be forwarded to the output device via the HDMI port. Such a variant can enable to obtain, compared to the embodiment of FIG. 2B, an audio signal of better quality (and notably without ambient noise). Furthermore, the obtaining of the audio signature is not disrupted when the tuning device is muted.

Figure 5:
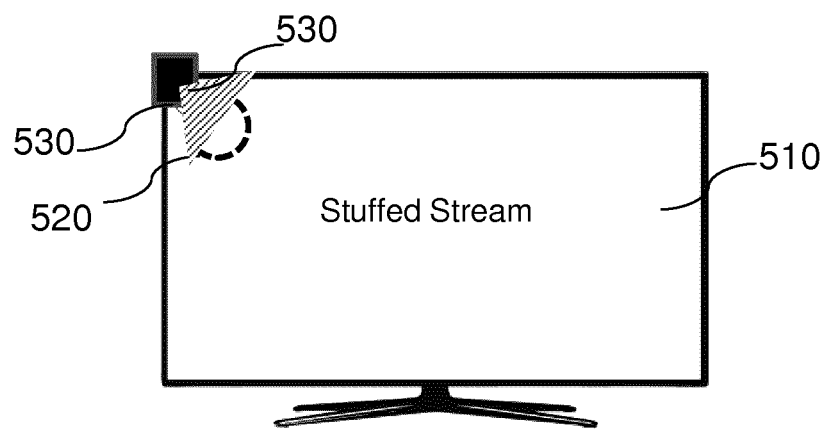
FIG. 5 illustrates a front view of a TV set coupled to an output device, comprising or coupled to a visual sensor, compatible with the embodiment of FIG. 2D.

FIGS. 2D and 5 Illustrate another exemplary embodiment, to be implemented by an output device comprising or being coupled to an image capturing device, where the signature comprises a visual part. For instance, the visual part can correspond to data of video type, present in a light stream (and in the corresponding output analog stream), resulting in a specific color, a specific shape, a specific object, a blinking or a watermark to be rendered on a display (notably in a specific part of the display). In some embodiments, the visual signature can be positioned in a way that enables the capturing device to scan the part of the display where the signature is to be rendered. Notably, the visual signature can be displayed in a location of a display staying constant over the time. In the example illustrated by FIG. 5, a visual signature 520 can be rendered in a corner of the display 510 (for instance the high left corner), and the image capturing device 530 can be a camera located front of the same corner of the display. The camera is thus adapted to capture a signature located in its field of view 532 and to provide the captured signature to the output device. In other embodiments, the visual signature can a specific color, associable to a specific channel, rendered on the whole display (and thus detectable by a camera or a photosensor located anywhere in front of the rendering device). In some embodiments, the visual signature can be a specific blinking, adapted to be sensed from a location other than the front of the display (like at the side of the display or even in some situations at the rear of the display). Such embodiment can be adapted to be implemented by an output device with an integrated sensor.

It is to be pointed out that depending on embodiments, all the streams of the LAN network can comprise a same kind of signature (for instance all streams can comprise a visual signature to be rendered at a given location of a display, or all streams can comprise an audio signature), or the kind of signature can vary upon the streams (for instance some streams can comprise a visual signature to be rendered at a given location of a display, while some other streams can comprise an audio signature). Also, depending on embodiments, a signature can be of a single type (for instance either visual or audio) or of a composed type (comprising for instance a visual part and an audio part).

Optionally, in some embodiments, the method 700 can also comprise receiving a channel scan request. For instance, the channel scan request can be obtained from a user interface of the output device (like a dedicated button) or, when the output device is integrated in the tuning device, from a user interface of the tuning device or from a remote-control of the tuning device. In such embodiments, the method comprises transmitting 770, via the LAN 150, the channel scan request to the input device.

The present disclosure has been described mostly in relation with FIG. 1B which illustrates an exemplary case where an input device 110 is associated with a single output device. Of course, as it can be understandable by a person skilled in the art, the present disclosure can also be applied to communication systems where an input device 110 is associated with several output devices 120, 130, each output device 120, 130 being respectively coupled to a tuning device 124, 134 as illustrated by FIG. 1C.

When the same input device is associated with several output devices, each tuning device coupled to an output device to which the input device is associated will receive the same LAN signal. Thus, in some embodiments with such situation can be encountered (for instance an input device equipped with a single tuner), only a single output device can be allowed to perform change requests, the other output devices acting as slave devices and rendering the same channels for instance. Such an embodiment can be adapted to situations where a visual part of a content is rendered by several displays (in a same room for instance) while the audio part of the content is rendered via the same speakers for the whole room (like a conference room). Such an embodiment can also be adapted to situations sometimes known as "follow me" where a user wants to continue watching the same content when moving between several rooms inside a house.

In other embodiments, each output device can be associated with a different input device, thus forming independent sub-systems. Such an embodiment can be adapted to situations where several tuning devices are located in different rooms for instance.

In some embodiments, when an input device contains several tuners, each of the tuner can be associated with a different output device and can be controlled independently by change requests emitted by this output device.

The present disclosure has been described in relation with a protocol. Of course, as it can be understandable by a person skilled in the art, the present disclosure can also be applied to a communication system using other communication protocols, notably communication protocols not related to WIFI or HDMI standards.

As can be appreciated by one skilled in the art, aspects of the present principles can be embodied as a system, device, method, signal or computer readable product or medium.

Notably, the present disclosure relates to a method, implemented in an electronic device, the method comprising:
  receiving, from a first network, an input signal conveying a plurality of audio and/or video channels;
  sending, on a second network, a first signal comprising a first digital stream conveying a first audio and/or video channel comprised in the input signal and at least one other digital stream requiring less bandwidth than a digital stream conveying an audio and/or video channel of the input signal.

The input signal can be an analog signal.

According to at least one embodiment of the present disclosure, the method comprises performing a channel scan on the broadcast network before receiving the input signal.

According to at least one embodiment of the present disclosure, the method comprises, upon receiving a channel change request identifying a second of the audio and/or video channels, sending, on the second network, a second signal comprising a second digital stream conveying the second channel, and at least one other digital stream requiring less bandwidth than a digital stream conveying an audio and/or video channel of the input signal. According to another aspect, the present disclosure relates to an electronic device comprising at least one processor adapted for:
  receiving, from a first network, an input signal conveying a plurality of audio and/or video channels;
  sending, on a second network, a first signal comprising a first digital stream conveying a first audio and/or video channel comprised in the input signal and at least one other digital stream requiring less bandwidth than a digital stream conveying an audio and/or video channel of the input signal.

According to at least one embodiment of the present disclosure, the at least one processor is configured for:
  upon receiving a channel change request identifying a second of the audio and/or video channels, sending, on the second network, a second signal comprising a second digital stream conveying the second channel, and at least one other digital stream requiring less bandwidth than a digital stream conveying an audio and/or video channel of the input signal.

According to another aspect, the present disclosure relates to an electronic device comprising at least one processing circuitry, the at least one processing circuitry being adapted for:
  receiving, from a first network, an input signal conveying a plurality of audio and/or video channels;
  sending, on a second network, a first signal comprising a first digital stream conveying a first audio and/or video channel comprised in the input signal and at least one other digital stream requiring less bandwidth than a digital stream conveying an audio and/or video channel of the input signal.

According to at least one embodiment, the at least one processing circuitry is configured for:
  upon receiving a channel change request identifying a second of the audio and/or video channels, sending, on the second network, a second signal comprising a second digital stream conveying the second channel, and at least one other digital stream requiring less bandwidth than a digital stream conveying an audio and/or video channel of the input signal.

According to at least one embodiment, no digital stream of the second signal conveys the first audio and/or video channel.

According to at least one embodiment, the first and/or second signal has a same number of streams as the number of audio and/or video channels of the input signal.

According to at least one embodiment, the other digital stream comprises at least one element of a group comprising:
  padding data;
  a signature of one of the audio and/or video channel;
  metadata associated with one of the audio and/or video channel;
  an audio part of data comprised in one of the audio and/or video channel;
  a video part of data comprised in one of the audio and/or video channel;
  a low-resolution version of data comprised in one of the audio and/or video channel.

Some embodiments of the present disclosure also concern a method comprising:
  receiving, from a first network, an input signal conveying a plurality of audio and/or video channels;
  sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel. and requiring less bandwidth than a digital stream conveying said other second audio and/or video channel of said input signal According to at least one embodiment of the present disclosure, the method comprises, upon receiving a channel change request identifying a third of said audio and/or video channels, sending, on said second network, a second signal comprising a third digital stream conveying said third channel, said second signal comprising, for at least one fourth channel of said plurality of audio and/or video channels other than said third channel, a fourth digital stream comprising an identifying information of said other fourth channel. and requiring less bandwidth than a digital stream conveying said other fourth audio and/or video channel of said input signal.

Some embodiments of the present disclosure also concern an electronic device comprising at least one processor adapted for receiving, from a first network, an input signal conveying a plurality of audio and/or video channels;

sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel. and requiring less bandwidth than a digital stream conveying said other second audio and/or video channel of said input signal According to at least one embodiment of the present disclosure, the at least one processor is configured for:
upon receiving a channel change request identifying a third of said audio and/or video channels, sending, on said second network, a second signal comprising a third digital stream conveying said third channel, said second signal comprising, for at least one fourth channel of said plurality of audio and/or video channels other than said third channel, a fourth digital stream comprising an identifying information of said other fourth channel. and requiring less bandwidth than a digital stream conveying said other fourth audio and/or video channel of said input signal.

Some embodiments of the present disclosure also concern an electronic device comprising at least one processing circuitry adapted for receiving, from a first network, an input signal conveying a plurality of audio and/or video channels;

sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel. and requiring less bandwidth than a digital stream conveying said other second audio and/or video channel of said input signal According to at least one embodiment of the present disclosure, the at least one processing circuitry is configured for:
upon receiving a channel change request identifying a third of said audio and/or video channels, sending, on said second network, a second signal comprising a third digital stream conveying said third channel, said second signal comprising, for at least one fourth channel of said plurality of audio and/or video channels other than said third channel, a fourth digital stream comprising an identifying information of said other fourth channel. and requiring less bandwidth than a digital stream conveying said other fourth audio and/or video channel of said input signal.

According to at least one embodiment, no digital stream of the second signal conveys the first audio and/or video channel.

According to at least one embodiment, the first and/or second signal has a same number of streams as the number of audio and/or video channels of the input signal.

According to at least one embodiment, the other digital stream comprises at least one element of a group comprising:

padding data;

a signature of one of the second and/or fourth audio and/or video channel;

metadata associated with one of the second and/or fourth audio and/or video channel;

an audio part of data comprised in one of the second and/or fourth audio and/or video channel;

a video part of data comprised in one of the second and/or fourth audio and/or video channel;

a low-resolution version of data comprised in one of the second and/or fourth audio and/or video channel;

a frequency of said other audio and/or video channel in said input signal.

According to at least one embodiment, the signature is an audio and/or video signature.

While not explicitly described, the above electronic device of the present disclosure can be adapted to perform the above method of the present disclosure in any of its embodiments.

According to another aspect, the present disclosure relates to a method, implemented in an electronic device, the method comprising:

receiving, via a first network, a first digital signal comprising a plurality of streams, at least one of the streams conveying an audio and/or video channel, converting the first digital signal to an output signal;

outputting the output signal to a tuning device coupled to the output device;

upon obtaining a channel identifier representative of a tuning performed by the tuning device, sending a channel change request via the first network, the channel change request comprising the channel identifier, to a transmitter of the first digital signal.

According to another aspect, the present disclosure relates to an electronic device comprising at least one processor, the at least one processor being adapted for:

receiving, via a first interface, a first digital signal comprising a plurality of streams, at least one of the streams conveying an audio and/or video channel;

converting the first signal to an output signal;

output the output signal to a tuning device coupled to the electronic device;

upon obtaining a channel identifier representative of a tuning performed by the tuning device, sending a channel change request via the first interface, the change request comprising the channel identifier, to a transmitter of the first signal.

According to another aspect, the present disclosure relates to an electronic device comprising at least one processing circuitry, the at least one processing circuitry being adapted for:

receiving, via a first interface, a first digital signal comprising a plurality of streams, at least one of the streams conveying an audio and/or video channel;

converting the first signal to an output signal;
output the output signal to a tuning device coupled to the electronic device;
upon obtaining a channel identifier representative of a tuning performed by the tuning device, sending a channel change request via the first interface, the change request comprising the channel identifier, to a transmitter of the first signal.

According to at least one embodiment, the channel identifier is obtained by capturing at least one item of information rendered from said tuning device.

According to at least one embodiment, the electronic device is integrated in the tuning device.

According to at least one embodiment, the electronic device is adapted to be coupled externally to the tuning device via the output interface.

According to at least one embodiment, the channel identifier is obtained by capturing at least one item of information rendered from the tuning device.

For instance, the item of information can be rendered by the tuning device or on a deported display and/or speaker.

According to at least one embodiment, the item of information comprises an audio signature and/or a visual signature.

According to at least one embodiment, the input interface is adapted to be connected to an antenna, for instance via a connector (like a wall socket).

According to at least one embodiment, the channel identifier is obtained from a software application implemented in the tuning device.

According to at least one embodiment, the software application is a background application monitoring changes requests in a log file of the tuning device.

According to at least one embodiment, the software application is an android TV-input application having knowledge of a channel change request received by the tuning device.

While not explicitly described, the above electronic device of the present disclosure can be adapted to perform the above method of the present disclosure in any of its embodiments.

According to another aspect, the present disclosure relates to a communication system comprising at least one input electronic device and at least one output electronic device,
the input electronic device comprising at least one processor adapted for:
receiving, from a first network, an input signal conveying a plurality of audio and/or video channels;
sending, on a second network, a first signal comprising a first digital stream conveying a first audio and/or video channel comprised in the input signal and at least one other digital stream requiring less bandwidth than a digital stream conveying an audio and/or video channel of the input signal;
and the output electronic device comprising at least one processor adapted for:
receiving the first digital signal, from the second network, converting the first signal to an output signal;
output the output signal to a tuning device coupled to the output electronic device;
upon obtaining a channel identifier representative of a tuning performed by the tuning device, sending a channel change request via the second network, the change request comprising the channel identifier, to the input electronic device.

Notably, some embodiments of the present disclosure concern a communication system comprising at least one input electronic device and at least one output electronic device, the input electronic device comprising at least one processor adapted for:
receiving, from a first network, an input signal conveying a plurality of audio and/or video channels;
sending, on a second network, a first signal comprising one or more a first digital stream conveying a first audio and/or video channel comprised in the input signal, said first signal comprising, for at least one channel of said plurality of audio and/or video channels other than said at least one first channel, another digital stream comprising an identifying information of said other channel. and requiring less bandwidth than a digital stream conveying said other audio and/or video channel of said input signal;
and the output electronic device comprising at least one processor adapted for:
receiving the first digital signal, from the second network, converting the first signal to an output signal;
output the output signal to a tuning device coupled to the output electronic device;
upon obtaining a channel identifier representative of a tuning performed by the tuning device, sending a channel change request via the second network, the change request comprising the channel identifier, to the input electronic device.

While not explicitly described, the present embodiments related to the methods or to the corresponding electronic devices or communication system can be employed in any combination or sub-combination.

According to another aspect, the present disclosure relates to a non-transitory computer readable program product comprising program code instructions for performing, when the non-transitory software program is executed by a computer, at least one of the methods of the present disclosure, in any of its embodiments.

Notably, at least one embodiment of the present disclosure relates to a non-transitory computer readable program product comprising program code instructions for performing, when the non-transitory software program is executed by a computer, a method, implemented in an electronic device, the method comprising:
receiving, from a first network, an input signal conveying a plurality of audio and/or video channels;
sending, on a second network, a first signal comprising a first digital stream conveying a first audio and/or video channel comprised in the input signal and at least one other digital stream requiring less bandwidth than a digital stream conveying an audio and/or video channel of the input signal.

Notably, some embodiments of the present disclosure concern a non-transitory computer readable program product comprising program code instructions for performing, when the non-transitory software program is executed by a computer, a method implemented in an electronic device and comprising:
receiving, from a first network, an input signal conveying a plurality of audio and/or video channels;
sending, on a second network, a first signal comprising one or more first digital stream conveying at least one first audio and/or video channel comprised in said input signal, said first signal comprising, for at least one channel of said plurality of audio and/or video channels other than said at least one first channel, another digital stream comprising an identifying information of said other channel. and requiring less bandwidth than a digital stream conveying said other audio and/or video channel of said input signal.

Notably, at least one embodiment of the present disclosure relates to a non-transitory computer readable program product comprising program code instructions for performing, when the non-transitory software program is executed by a computer, a method, implemented in an electronic device, the method comprising:
- receiving, via a first network, a first digital signal comprising a plurality of streams, at least one of the streams conveying an audio and/or video channel,
- converting the first digital signal to an output signal;
- outputting the output signal to a tuning device coupled to the output device;
- upon obtaining a channel identifier representative of a tuning performed by the tuning device, sending a channel change request via the first network, the channel change request comprising the channel identifier, to a transmitter of the first digital signal. According to another aspect, the present disclosure relates to a computer readable storage medium carrying a software program comprising program code instructions for performing, when the non-transitory software program is executed by a computer, at least one of the methods of the present disclosure, in any of its embodiments.

According to an embodiment of the present disclosure, the computer readable storage medium tangibly embodies a program of instructions executable by a computer for performing, when the non-transitory software program is executed by a computer, a method, implemented in an electronic device, the method comprising:
- receiving, from a first network, an input signal conveying a plurality of audio and/or video channels;
- sending, on a second network, a first signal comprising a first digital stream conveying a first audio and/or video channel comprised in the input signal and at least one other digital stream requiring less bandwidth than a digital stream conveying an audio and/or video channel of the input signal.

Notably, some embodiments of the present disclosure concern a computer readable storage medium carrying a software program comprising program code instructions for performing, when the non-transitory software program is executed by a computer, a method implemented in an electronic device and comprising:
- receiving, from a first network, an input signal conveying a plurality of audio and/or video channels;
- sending, on a second network, a first signal comprising one or more first digital stream conveying at least one first audio and/or video channel comprised in said input signal, said first signal comprising, for at least one channel of said plurality of audio and/or video channels other than said at least one first channel, another digital stream comprising an identifying information of said other channel. and requiring less bandwidth than a digital stream conveying said other audio and/or video channel of said input signal According to an embodiment of the present disclosure, the computer readable storage medium carries a software program comprising program code instructions, when the non-transitory software program is executed by a computer, a method implemented in an electronic device and comprising:
- receiving, from a first network, an input signal conveying a plurality of audio and/or video channels;
- sending, on a second network, a first signal comprising one or more first digital stream conveying at least one first audio and/or video channel comprised in said input signal, said first signal comprising, for at least one channel of said plurality of audio and/or video channels other than said at least one first channel, another digital stream comprising an identifying information of said other channel. and requiring less bandwidth than a digital stream conveying said other audio and/or video channel of said input signal Notably, according to some embodiments of the present disclosure, the computer readable storage medium carries a software program comprising program code instructions, when the non-transitory software program is executed by a computer, a method implemented in an electronic device and comprising:
- receiving, from a first network, an input signal conveying a plurality of audio and/or video channels;
- sending, on a second network, a first signal comprising one or more first digital stream conveying at least one first audio and/or video channel comprised in said input signal, said first signal comprising, for at least one channel of said plurality of audio and/or video channels other than said at least one first channel, another digital stream comprising an identifying information of said other channel. and requiring less bandwidth than a digital stream conveying said other audio and/or video channel of said input signal According to an embodiment of the present disclosure, the computer readable storage medium tangibly embodies a program of instructions executable by a computer for performing, when the non-transitory software program is executed by a computer, a method, implemented in an electronic device, the method comprising:
- receiving, via a first network, a first digital signal comprising a plurality of streams, at least one of the streams conveying an audio and/or video channel,
- converting the first digital signal to an output signal;
- outputting the output signal to a tuning device coupled to the output device;
- upon obtaining a channel identifier representative of a tuning performed by the tuning device, sending a channel change request via the first network, the channel change request comprising the channel identifier, to a transmitter of the first digital signal According to an embodiment of the present disclosure, the computer readable storage medium carries a software program comprising program code instructions, when the non-transitory software program is executed by a computer, a method, implemented in an electronic device, the method comprising:
- receiving, via a first network, a first digital signal comprising a plurality of streams, at least one of the streams conveying an audio and/or video channel,
- converting the first digital signal to an output signal;
- outputting the output signal to a tuning device coupled to the output device;
- upon obtaining a channel identifier representative of a tuning performed by the tuning device, sending a channel change request via the first network, the channel change request comprising the channel identifier, to a transmitter of the first digital signal.

According to another aspect, the present disclosure relates to a communication signal, adapted to be transmitted via a first network, the communication signal comprising a plurality of digital streams wherein at least one first of the streams is a stream conveying an audio and/or video channel comprised in an input signal, for instance an analog signal, the communication signal comprising at least one other digital stream requiring less bandwidth (for being transmitted notably) than a digital stream conveying one of the audio and/or video channel of the input signal. The communication signal can notably have a same number of streams as the number of channels of the analog signal.

Notably, some embodiments of the present disclosure concern a communication signal, adapted to be transmitted via a first network, the communication signal comprising a plurality of digital streams, wherein at least one first of the digital streams is a stream conveying at least one first audio and/or video channel of a plurality of audio and/or video channels, the communication signal comprising at least one other digital stream comprising, for at least one channel of said plurality of audio and/or video channels other than said at least one first channel, an identifying information of said other channel, the at least one other digital stream requiring less bandwidth than a digital stream conveying said other audio and/or video channel of said input signal.

As can be appreciated by one skilled in the art, aspects of the present principles can be embodied as a system, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", "module" or "system". Furthermore, aspects of the present principles can take the form of a computer readable storage medium. Any combination of one or more computer readable storage medium may be utilized.

A computer readable storage medium can take the form of a computer readable program product embodied in one or more computer readable medium and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage media to which the present principles can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing. Thus, for example, it can be appreciated by those skilled in the art that the block diagrams presented herein represent conceptual views of illustrative system components and/or circuitry of some embodiments of the present principles. Similarly, it can be appreciated that any flow charts, flow diagrams, state transition diagrams, pseudo code, and the like represent various processes which may be substantially represented in computer readable storage media and so executed by a computer or processor, whether such computer or processor is explicitly shown.

The invention claimed is:

1. A method, implemented in an electronic device, the method comprising:
receiving, from a first network, an input signal conveying a plurality of audio and/or video channels;
sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel and requiring less bandwidth than a digital stream conveying said other second audio and/or video channel of said input signal, and
upon receiving a channel change request identifying a third of said audio and/or video channels, sending, on said second network, a second signal comprising a third digital stream conveying said third channel, said second signal comprising, for at least one fourth channel of said plurality of audio and/or video channels other than said third channel, a fourth digital stream comprising an identifying information of said other fourth channel and requiring less bandwidth than a digital stream conveying said other fourth audio and/or video channel of said input signal,
wherein said first and/or second signal has a same number of streams as the number of audio and/or video channels of said input signal.

2. An electronic device comprising:
at least one processor adapted for implementing:
receiving, from a first network, an input signal conveying a plurality of audio and/or video channels; and
sending, on a second network, a first signal comprising one or more first digital stream conveying at least one first audio and/or video channel comprised in said input signal, said first signal comprising, for at least one second channel of said plurality of audio and/or video channels other than said at least one first channel, a second digital stream comprising an identifying information of said other second channel and requiring less bandwidth than a digital stream conveying said other second audio and/or video channel of said input signal,
wherein said at least one processor is configured for:
upon receiving a channel change request identifying a third of said audio and/or video channels, sending, on said second network, a second signal comprising a third digital stream conveying said third channel, said second signal comprising, for at least one fourth channel of said plurality of audio and/or video channels other than said third channel, a fourth digital stream comprising an identifying information of said other third channel and requiring less bandwidth than a digital stream conveying said other third audio and/or video channel of said input signal and wherein said first and/or second signal has a same number of streams as the number of audio and/or video channels of said input signal.

3. The electronic device of claim 2, wherein no digital stream of said second signal conveys said first audio and/or video channel.

4. The electronic device claim 2, wherein said other second and/or fourth digital stream comprises at least one element of a group comprising:
padding data;
a signature of said other second and/or fourth audio and/or video channel;
metadata associated with said other second and/or fourth audio and/or video channel;
an audio part of data comprised in said other second and/or fourth audio and/or video channel;
a video part of data comprised in said other second and/or fourth audio and/or video channel; and a low-resolution version of data comprised in said other second and/or fourth audio and/or video channel a frequency of said other second and/or fourth audio and/or video channel in said input signal.

5. The electronic device of claim 4, wherein said signature is an audio and/or video signature.

6. A non-transitory computer readable program product comprising program code instructions for performing, when the non-transitory software computer readable program is executed by a computer, a method according to claim 1.

7. A computer readable storage medium carrying a software program comprising program code instructions for performing, when the non-transitory software program is executed by a computer, a method according to claim 1.

* * * * *